United States Patent
Kaneko et al.

(10) Patent No.: US 9,821,405 B2
(45) Date of Patent: Nov. 21, 2017

(54) METHOD AND SYSTEM FOR RESISTANCE SEAM WELDING WITH ELECTRODE ROLLERS

(71) Applicant: HONDA MOTOR CO., LTD., Tokyo (JP)

(72) Inventors: Mitsugu Kaneko, Tochigi (JP);
Yasuhiro Kawai, Tochigi (JP);
Kazuhiko Yamaashi, Tochigi (JP);
Noriko Kurimoto, Tochigi (JP);
Haruhiko Kobayashi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 14/765,109

(22) PCT Filed: Feb. 7, 2014

(86) PCT No.: PCT/JP2014/052952
§ 371 (c)(1),
(2) Date: Jul. 31, 2015

(87) PCT Pub. No.: WO2014/126021
PCT Pub. Date: Aug. 21, 2014

(65) Prior Publication Data
US 2015/0367441 A1  Dec. 24, 2015

(30) Foreign Application Priority Data

Feb. 15, 2013 (JP) ................................. 2013-028451

(51) Int. Cl.
*B23K 11/25* (2006.01)
*B23K 11/06* (2006.01)
*B23K 101/18* (2006.01)

(52) U.S. Cl.
CPC ............ *B23K 11/253* (2013.01); *B23K 11/06* (2013.01); *B23K 11/061* (2013.01); *B23K 2201/18* (2013.01)

(58) Field of Classification Search
CPC ..... B23K 11/06; B23K 11/061; B23K 11/253; B23K 2201/18
See application file for complete search history.

(56) References Cited

U.S. PATENT DOCUMENTS 4,296,304 A * 10/1981 Defourny ............. B23K 11/253
219/110
5,391,853 A  2/1995 Grau et al.
(Continued)

FOREIGN PATENT DOCUMENTS

JP  2005-66683  3/2005
JP  2010-158692  7/2010

OTHER PUBLICATIONS

International Search Report dated Apr. 22, 2014, Application No. PCT/JP2014/052952, English translation included, 2 pages.

*Primary Examiner* — Geoffrey S Evans
(74) *Attorney, Agent, or Firm* — Rankin, Hill & Clark LLP

(57) ABSTRACT

Distance to the upper face of workpieces W sandwiched between electrode rollers 15 and 16 is measured by a range sensor 41 that has a predetermined positional relationship with the electrode rollers 15 and 16 (STEPs 1, 3). Correction is made based on the distance found by the range sensor 41 by moving the pair of electrode rollers 15, 16 with reference to the workpieces W so that an angle Rx between a straight line L0 connecting centers of the pair of electrode rollers 15, 16 and the surface of the plurality of workpieces W is preset angle (STEP 5).

4 Claims, 6 Drawing Sheets

(56) References Cited

U.S. PATENT DOCUMENTS

| | | | |
|---|---|---|---|
| 2005/0023256 A1* | 2/2005 | Sankaranarayanan | ...................... B23K 26/0823 219/121.63 |
| 2011/0120979 A1* | 5/2011 | Kaga .................... | B23K 11/061 219/102 |
| 2011/0163074 A1* | 7/2011 | Kaga ...................... | B23K 11/04 219/83 |
| 2012/0074103 A1* | 3/2012 | Hasegawa ............ | B23K 11/061 219/102 |

* cited by examiner

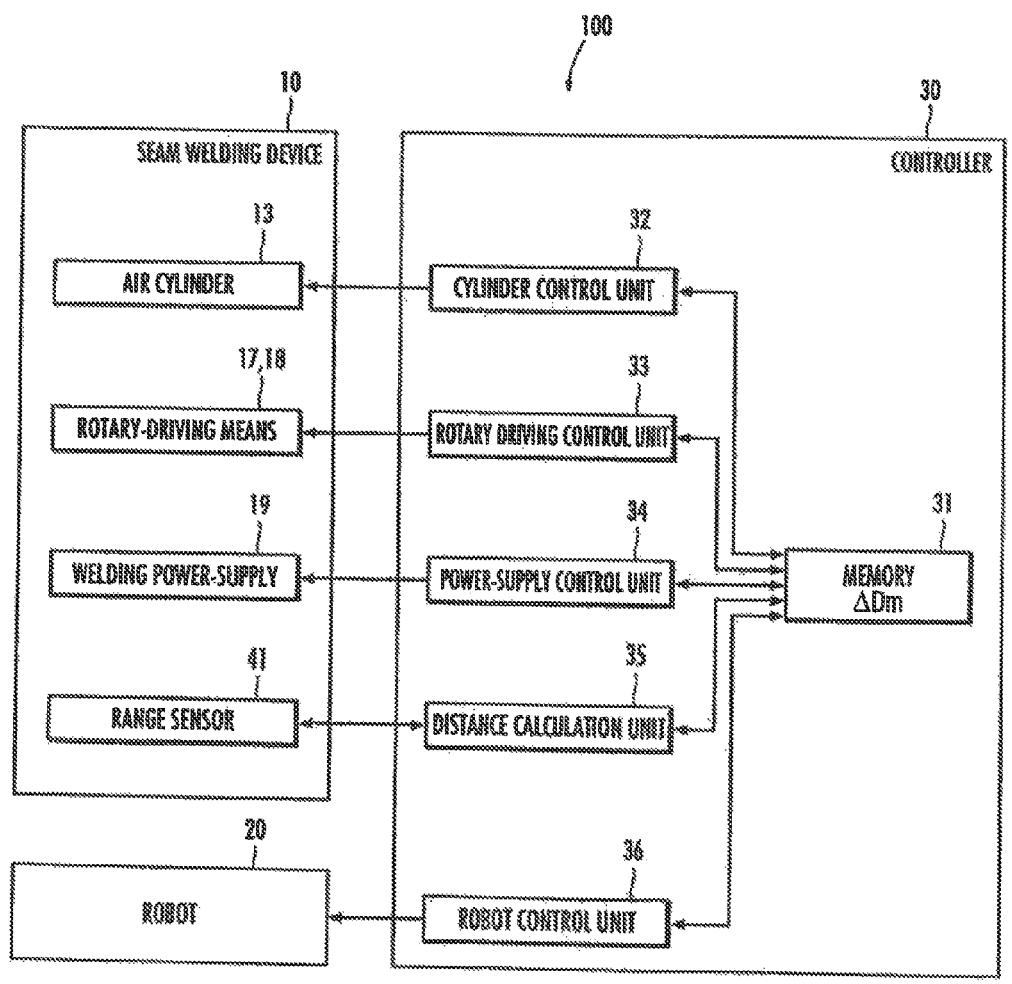

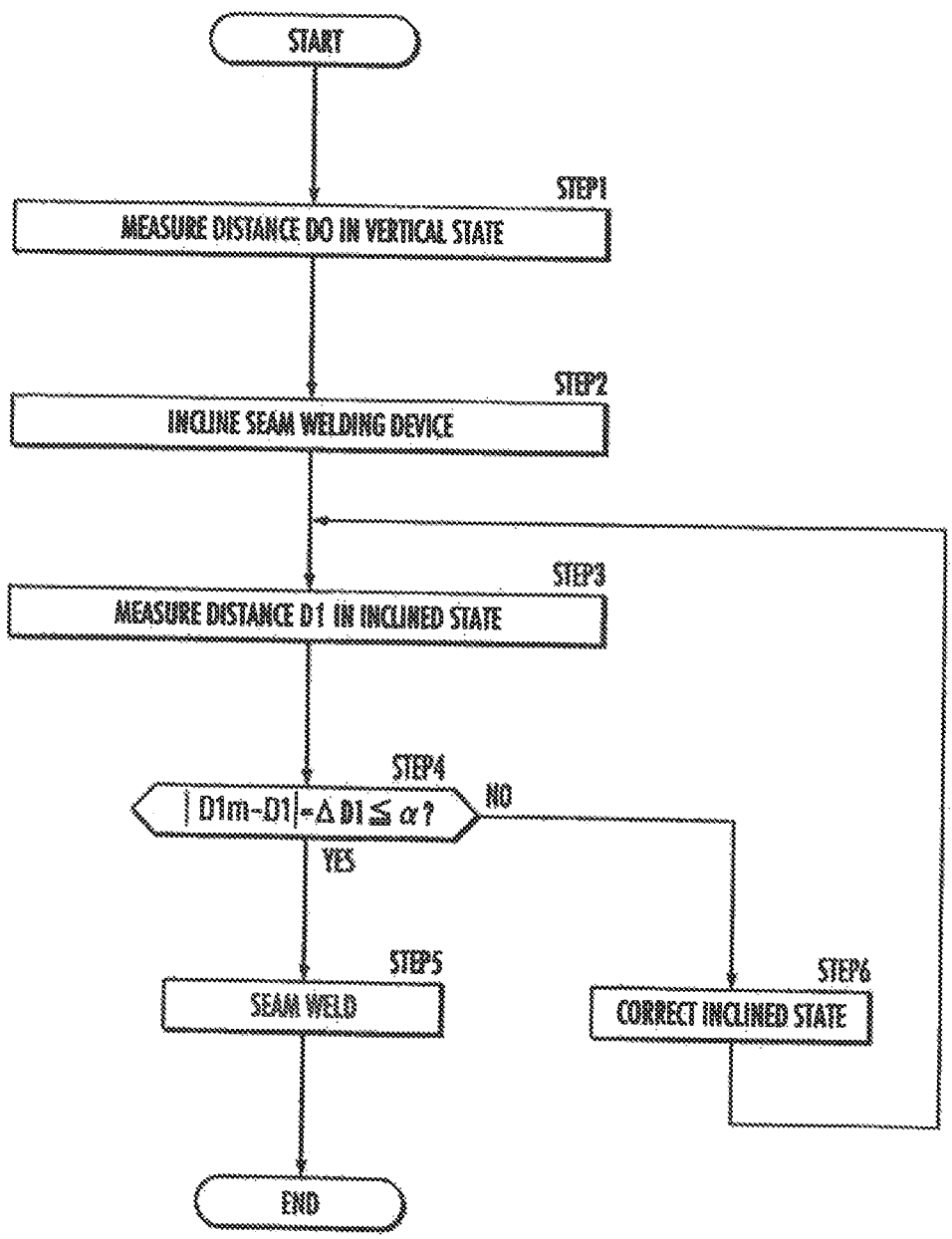

METHOD AND SYSTEM FOR RESISTANCE SEAM WELDING WITH ELECTRODE ROLLERS

TECHNICAL FIELD

The present invention relates to a seam-welding method and such a system.

BACKGROUND ART

Conventionally seam-welding is known, in which a plurality of workpieces to be welded are sandwiched between a pair of electrode rollers, and the workpieces are welded while rotating the electrode rollers, to which pressure and electricity are applied, and while continuously moving the contact point between the electrode rollers and the workpieces using a robot.

Patent Literature 1 describes the technique of detecting the load applied in the direction that is perpendicular to the direction to press the workpiece by the electrode rollers at the welding point and to the delivering direction of the workpiece by the robot at the welding point, and turning the electrode rollers about the pressing direction in accordance with the detected load for track correction.

CITATION LIST

Patent Literature

Patent Literature 1: Japanese Patent Application Laid-Open No. 2010-158692

SUMMARY OF THE INVENTION

Technical Problem

In order to perform seam-welding while keeping the welding state constant, the pressing direction of the workpieces by the electrode rollers has to be kept constant. Especially when the part of the workpieces to be welded is round and is not flat, or when the metal thin plate making up a workpiece is not uniform in thickness, the pressing direction of the workpieces by the electrode rollers easily changes.

In view of these points, the present invention aims to provide a seam-welding method and such a system capable of keeping the pressing direction of workpieces by electrode rollers constant.

Solution to Problem

A seam-welding method of the present invention is to perform seam-welding of a plurality of workpieces that are sandwiched between a pair of electrode rollers, while continuously moving a contact point between the electrode rollers and the workpieces and applying electricity across the electrode rollers. The method includes the steps of: measuring distance to a surface of the plurality of workpieces that are sandwiched between the pair of electrode rollers by measurement means that has a predetermined positional relationship with the pair of electrode rollers; and making a correction based on the distance found by the measurement step by moving the pair of electrode rollers with reference to the workpieces so that an angle between a straight line connecting centers of the pair of electrode rollers and the surface of the plurality of workpieces is preset angle.

According to the seam-welding method of the present invention, correction is made based on the distance found by measurement means by moving the pair of electrode rollers with reference to the workpieces so that an angle (hereinafter this is called "inclination angle") between a straight line connecting centers of the pair of electrode rollers and the surface of the plurality of workpieces is preset angle. This can correct the inclination angle to be preset angle by moving the pair of electrode rollers with reference to the workpieces when the inclination angle is not the preset angle, and so the angle in the pressing direction of the workpieces by the electrode rollers can be kept constant.

Then, the correction is made based on the distance measured by the measurement means that has a predetermined positional relationship with the pair of electrode rollers, and so the measurement means can double as a sensor to detect the flange edge part of the workpieces, and any additional and new component is not required.

A seam-welding system of the present invention performs seam-welding of a plurality of workpieces that are sandwiched between a pair of electrode rollers, while continuously moving a contact point between the electrode rollers and the workpieces and applying electricity across the electrode rollers. The system includes: measurement means that measures distance to a surface of the plurality of workpieces that are sandwiched between the pair of electrode rollers, the measurement means having a predetermined positional relationship with the pair of electrode rollers; and correction means that moves the pair of electrode rollers with reference to the workpieces based on the distance found by the measurement means so that an angle between a straight line connecting centers of the pair of electrode rollers and the surface of the plurality of workpieces is preset angle.

According to the seam-welding system of the present invention, the correction means makes a correction based on the distance found by measurement means by moving the pair of electrode rollers with reference to the workpieces so that the inclination angle is preset angle. This can correct the inclination angle to be preset angle by moving the pair of electrode rollers with reference to the workpieces when the inclination angle is not the preset angle, and so the angle in the pressing direction of the workpieces by the electrode rollers can be kept constant.

BRIEF DESCRIPTION OF DRAWINGS

FIG. 2 is a block diagram illustrating the overall configuration of the seam-welding system.

FIG. 3A illustrates the vertical state and FIG. 3B illustrates the inclined state.

FIG. 4 is a flowchart to describe a seam-welding method according to one embodiment of the present invention.

FIG. 5A illustrates the vertical state and FIG. 5B illustrates the inclined state.

FIG. 6A illustrates the vertical state and FIG. 6B illustrates the inclined state.

DESCRIPTION OF EMBODIMENTS

The following describes a seam-welding system 100 according to one embodiment of the present invention, with reference to the drawings. The seam-welding system 100 is used for the manufacturing of a window frame, a fuel tank of a vehicle or the like by welding a plurality of workpieces W that are metal thin plates using a seam-welding device 10.

Figure 1:
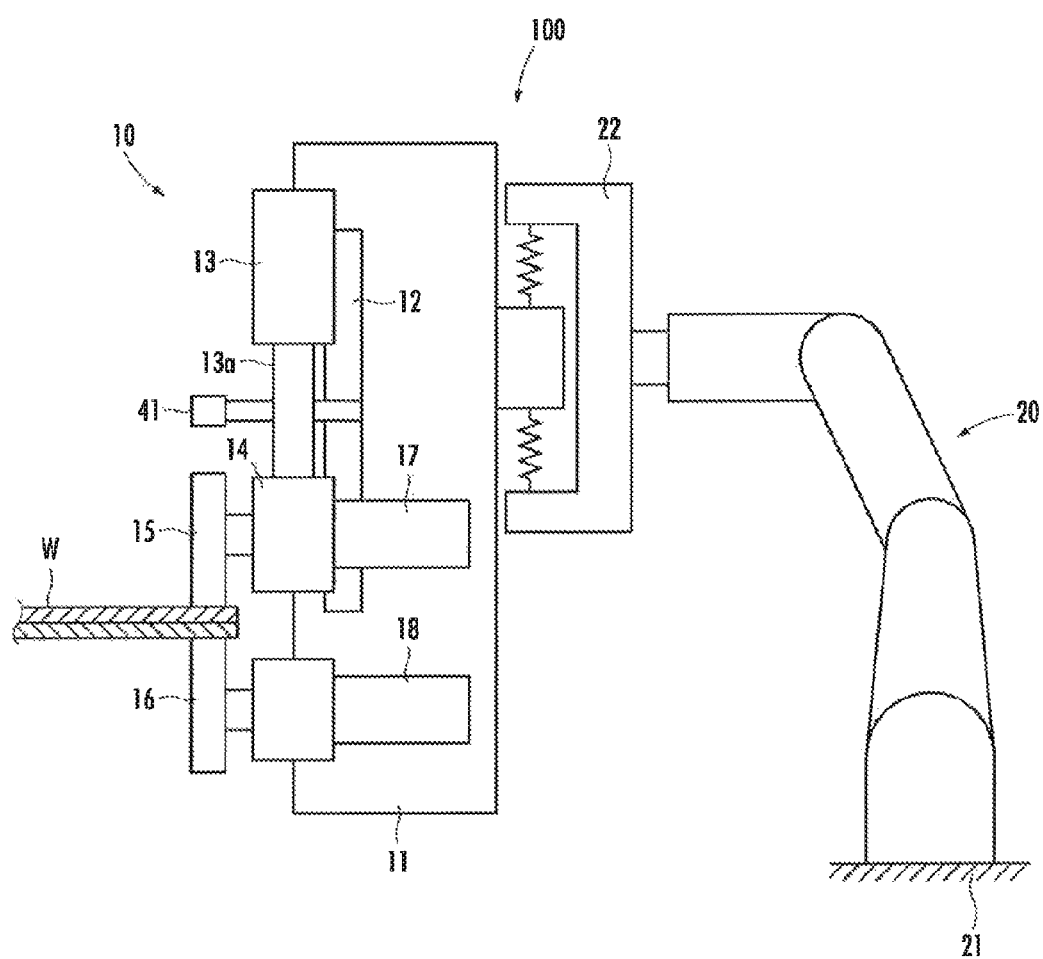
FIG. 1 schematically illustrates the overall configuration of a seam-welding system according to one embodiment of the present invention.

As illustrated in FIG. 1, the workpieces W are fixed at a predetermined position by a workpiece-fixing base not illustrated, and then undergo seam-welding by the seam-welding device 10 that is moved by a robot 20 along a predetermined track. Referring to FIG. 2, the seam-welding system 100 controls the seam-welding device 10 and the robot 20, and includes a controller 30 corresponding to control means of the present invention.

The robot 20 may be a multiple joint robot, such as a six-axis robot, having a plurality of arms coupled with joints, and is fixed to a base 21. Although not illustrated, the robot 20 includes driving means such as a servo motor and detection means such as an encoder to detect the shaft angle of the servo motor at each joint, and is configured to be feed-back controllable by the controller 30.

The arm that is located at the forward end of the robot 20 is provided with an equalizing mechanism 22 at the forward end part. Then the seam-welding device 10 is flexibly supported by the equalizing mechanism 22 at the forward end part of the arm of the robot 20. This allows the seam-welding device 10 to follow even small fluctuation at the part to be welded.

The seam-welding device 10 includes a base 11 that is attached to the robot 20 via the equalizing mechanism 22. On the base 11, a guide rail 12 is disposed so as to be extended in the vertical direction, and the guide rail 12 is provided with a movable base 14 that is movable by driving means 13 vertically along the guide rail 12.

Herein the driving means 13 is an air cylinder 13 having a piston rod 13a, and, the movable base 14 is jointed with the forward end part of the piston rod 13a of the air cylinder 13. The driving means may be an oil-hydraulic cylinder, a rotation motor equipped with a ball screw mechanism, a linear motor or the like.

The movable base 14 supports an upper electrode 15, and the base 11 supports a lower electrode 16. With this configuration, the lower electrode 16 is provided at a predetermined height position, and the upper electrode 15 is disposed to be vertically movable with reference to the lower electrode 16. Herein the upper electrode 15 and the lower electrode 16 are disk-shaped electrodes, which may be referred to as electrode rollers 15, 16 collectively.

The electrode rollers 15, 16 are connected to rotary-driving means 17 and 18 to rotary-drive the electrode rollers 15 and 16, respectively, in a predetermined rotation direction and at a predetermined rotation speed. The rotary-driving means 17 and 18 in this case is a servo motor, which may be a pulse motor or a normal motor equipped with a rotary encoder.

The upper electrode 15 is further connected to a welding power-supply 19 (see FIG. 2) that supplies current required for welding (welding current) and corresponds to welding current supply means of the present invention. The welding power-supply 19 supplies DC pulse current, which may supply AC current.

In this way, the piston rod 13a of the driving means 13 is elongated so as to move the upper electrode 15 down until the workpieces W are sandwiched between both electrodes 15 and 16, and in this state, welding current is supplied from the welding power-supply 19 to the upper electrode 15. This makes the welding current to flow through from the upper electrode 15 to the lower electrode 16 (grounding electrode) via the workpieces W sandwiched between the both electrode rollers 15, 16 for seam-welding of the workpieces.

As described above, the air cylinder 13 presses the upper electrode 15 toward the lower electrode 16, and presses the workpieces W sandwiched between the electrode rollers 15 and 16.

The base 11 or the movable base 14 is further provided with a range sensor 41 as measurement means to detect distance D from the surface of the workpieces W. The range sensor 41 is fixed to the base 11 or the movable base 14 while having a predetermined positional relationship with the electrode rollers 15, 16 sandwiching the workpieces W. Exemplary range sensor 41 includes a noncontact laser range finder, a contact linear scale sensor, or a magnet scale sensor.

Figure 3A:
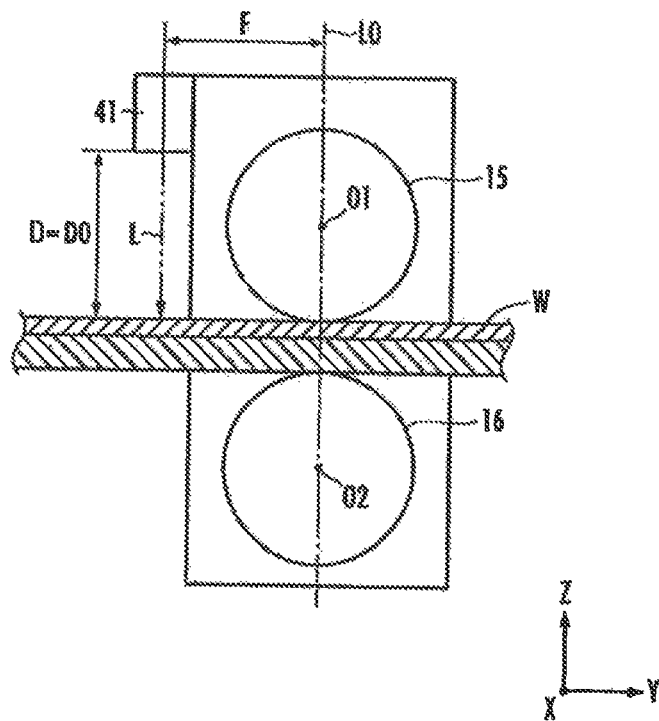
FIGS. 3A and 3B describe the relationship between electrode rollers and workpieces, where

As illustrated in FIG. 3, the range sensor 41 measures distance D to the upper face of the workpieces W on a detection line L that is parallel to the straight line L0 connecting the rotary center O1 of the upper electrode 15 and the rotary center O2 of the lower electrode 16. The straight line L0 and the detection line L are offset by distance F.

Let that, when the seam-welding device 10 has a posture such that the straight line L0 connecting the rotary center O1 of the upper electrode 15 and the rotary center O2 of the lower electrode 16 is extended in the vertical direction (Z direction) while sandwiching the workpieces between the upper electrode 15 and the lower electrode 16, the distance to the upper face of the workpieces W measured by the range sensor 41 is D0.

Figure 3B:
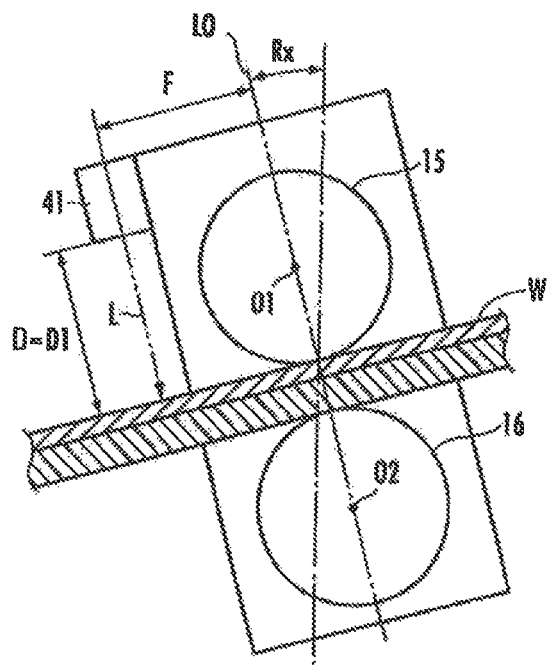

Then as illustrated in FIG. 3B, in the seam-welding device 10 having a predetermined posture where the workpieces W are sandwiched between the upper electrode 15 and the lower electrode 16, the straight line L0 is inclined from the vertical direction (Z direction) in the moving direction (+Y direction) of the contact point where the workpieces W are sandwiched between the upper electrode 15 and the lower electrode 16 by angle Rx. This angle Rx is called inclination angle.

At this time, the relationship of the following expression (1) holds for the distance D1 to the upper face of the workpieces W measured by the range sensor 41:

$$D1 = D0 - F \times \sin(Rx) \tag{1}.$$

Then, if there is a difference $\Delta D1$ between the distance D1 actually measured by the range sensor 41 and distance D1m that is preset in accordance with the inclination angle Rx, correction is made through the operation of the robot 20 so as to cancel the difference $\Delta D1$. Such correction is performed by the robot 20 so as to rotate the seam-welding device 10 around the X axis (the axis orthogonal to the moving direction of the contact point where the workpieces W are sandwiched between the upper electrode 15 and the lower electrode 16 and to the direction perpendicular thereto). When the seam-welding device 10 is moved by the robot 20 firstly to the predetermined posture, the rotating angle around the X axis may have a preset margin (allowance) with reference to the angle Rx.

As illustrated in FIG. 2, the controller 30 is an electronic circuit unit including a CPU or the like not illustrated, and is configured to execute a control program or a processing program held in a memory 31 by the CPU so as to function as a cylinder control unit 32 that controls the air cylinder 13, a rotary driving control unit 33 that controls the rotary-driving means 17, 18, a power-supply control unit 34 that controls the welding power-supply 19, a distance calculation unit 35 that receives a measurement signal from the range sensor 41 to find the distance D0, D1, and a robot control unit 36 that controls the robot 20, thus controlling the actions of the seam-welding device 10 and the robot 20.

The memory 31 stores teaching data for the robot 20 as well as welding control data, such as a moving amount of the piston rod 13a of the driving means 13, a rotary speed of the rotary-driving means 17 and 18, and a value of welding current supplied from the welding power-supply 19 in accordance with the welding condition. The memory 31 stores correction data for the robot 20 in accordance with the difference $\Delta D1$ as well.

Through execution of a measurement processing program by the CPU, the controller 30 functions as measurement means to find the distance D0, D1 and the difference $\Delta D1$ from a measurement signal input from the range sensor 41. Through execution of a control program by the CPU, the controller 30 functions as correction means as well to fetch correction data based on the difference $\Delta D1$ of the difference D1 from the memory 31, and move the seam-welding device 10 including the electrode rollers 15, 16 as a whole by the robot 20.

The controller 30 fetches the welding control data, the teaching data or the correction data stored in the memory 31 in accordance with the welding condition and creates a control signal, and then transmits the control signal to the air cylinder 13, the rotary-driving means 17 and 18, the welding power-supply 19 and the robot 20.

Referring next to the drawings, the following describes a seam-welding method according to one embodiment of the present invention using the thus described seam-welding system 100.

As illustrated in the flowchart of FIG. 4, firstly when the seam-welding device 10 is in the vertical state (the straight line L0 is vertical), a first measurement step is performed, in which the range sensor 41 measures the distance D0 to the upper face of the workpieces W (STEP 1).

Then, an inclination step is performed, in which the seam-welding device 10 is inclined by the robot 20 so that the seam-welding device 10 is inclined (the straight line L0 is inclined by the angle Rx) (STEP 2). While keeping this state, a second measurement step is performed, in which the range sensor 41 measures the distance D1 to the upper face of the workpieces W (STEP 3).

Then, a comparison step is performed, in which the distance D1 is compared with distance D1m that is distance when the seam-welding device is inclined by the angle Rx from the distance D0 in the vertical state and that is stored beforehand in the memory 31 (STEP 4).

In this comparison step, if the difference $\Delta D1$ (absolute value of D1m−D1) between the distance D1m and the distance D1 is within allowable error $\alpha$ stored beforehand in the memory 31 (STEP 4: YES), then seam-welding is performed (STEP 5).

In the comparison step, if the difference $\Delta D1$ exceeds the allowable error $\alpha$ (STEP 4: NO), then correction data based on the difference $\Delta D1$ is fetched from the memory 31. Then, a correction step is performed, in which the seam-welding device 10 is moved by the robot 20 so that the inclination angle becomes the angle Rx (STEP 6). Then, the measurement step (STEP 3) and the comparison step (STEP 4) are performed again.

In this way, in the present embodiment, correction is made so that the straight line L0 is inclined by the angle Rx based on the distance D0, D1 measured by the range sensor 41 (STEP 1, STEP 2) (STEP 6).

This can cancel the difference of the inclination angle from the preset angle Rx, if any. Then, the pressing direction of the workpieces W by the electrode rollers 15, 16 can be kept at the constant inclination angle Rx, and so favorable welding precision can be kept.

As the seam-welding is performed, the electrode rollers 15, 16 are gradually worn, and so are shaped by dressing. This can decrease the diameter of the electrode rollers 15 and 16. In this case, however, the distance D1 is found by expression (1) based on the distance D0 at the time of the measurement by the range sensor 41, and so correction can be made to the preset inclination angle Rx irrespective of the diameter of the electrode roller 15.

As the distance F increases, the correction precision of the inclination angle Rx is improved. However, the following has to be considered, that is, the range sensor 41 may be used to detect the flange edge position of the workpieces W to prevent the tracking displacement of the contact point between the electrode rollers 15, 16 and the workpieces W, and larger distance F may degrade the detection precision of the flange edge position.

When there is a difference in height resulting from the shape of the workpieces W between the contact point of the electrode roller 15 and the workpieces W and the point on the surface of the workpieces W that is distant from the contact point by the distance F, then the distance D0, D1 found by the range sensor 41 may be corrected, considering such a difference in height.

Figure 5A:
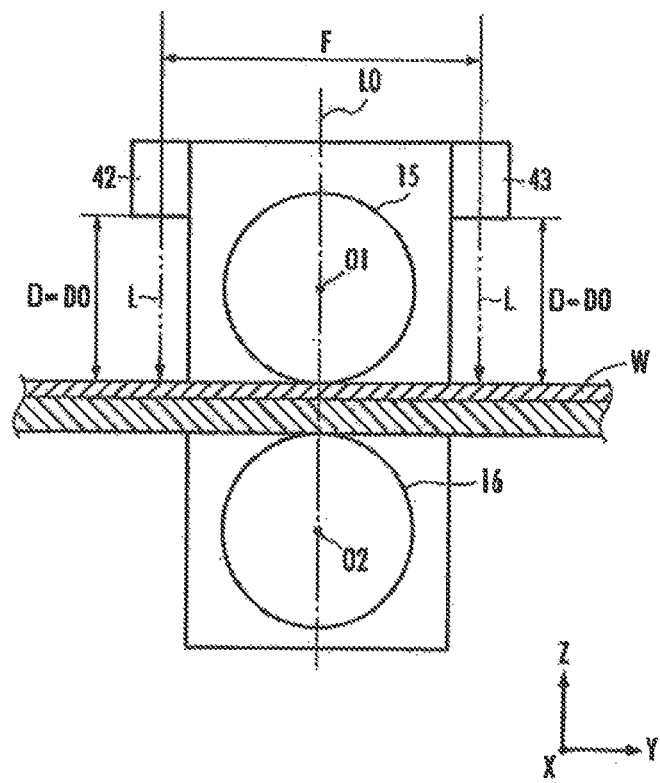
FIGS. 5A and 5B describe the relationship between electrode rollers and workpieces in another embodiment of the present invention, where

The following describes another embodiment of the present invention. As illustrated in FIG. 5A, this embodiment includes two range sensors 42 and 43 as measurement means to detect distance D to the surface of the workpieces W at the base 11 or the movable base 14. Exemplary range sensor 42, 43 includes a noncontact laser range finder, a contact linear scale sensor, or a magnet scale sensor.

Each of the two range sensors 42, 43 measures the distance D to the upper face of the workpieces W on a detection line L that is parallel to the straight line L0. The two detection lines L are offset by distance F.

The range sensors 42, 43 are fixed so that, when the seam-welding device 10 has a posture such that the straight line L0 is extended in the vertical direction (Z direction) while sandwiching the workpieces between the upper electrode 15 and the lower electrode 16, values of the distance D0 to the upper face of the workpieces W measured by the range sensors 42 and 43 are equal to each other.

Figure 5B:
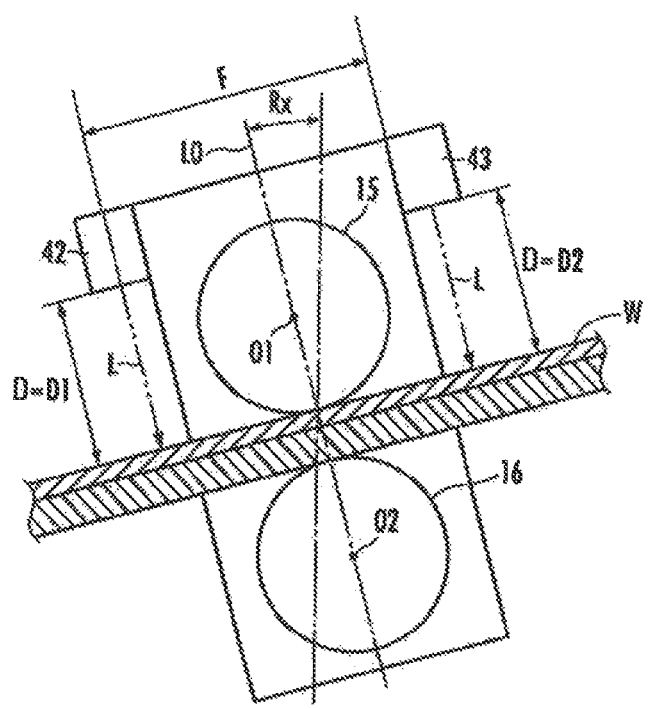

Then as illustrated in FIG. 5B, in the seam-welding device 10 having a predetermined posture where the workpieces W are sandwiched between the upper electrode 15 and the lower electrode 16, the straight line L0 is inclined from the vertical direction (Z direction) in the moving direction (+Y direction) of the contact point where the workpieces W are sandwiched between the upper electrode 15 and the lower electrode 16 by angle Rx.

At this time, the difference $\Delta D$ (absolute value of D1−D2) between distance D1 to the upper face of the workpieces W measured by the range sensor 42 and distance D2 to the upper face of the workpieces W measured by the range sensor 43 can be found from the following expression (2):

$$\Delta D = 2F \times \sin(Rx) \tag{2}$$

Then, correction is made through the operation of the robot 20 so that this $\Delta D$ becomes difference $\Delta Dm$ that is preset in accordance with the inclination angle Rx and is stored in the memory 31. Such correction is performed by the robot 20 so as to rotate the seam-welding device 10 around the X axis. When the seam-welding device 10 is moved by the robot 20 firstly to the predetermined posture, the rotating angle around the X axis may have a preset margin (allowance) with reference to the angle Rx.

In this way, the present embodiment is configured so that correction is made based on the difference ΔD of distance measured by the two range sensors 42 and 43 so that the straight line L0 is inclined by the inclination angle Rx. This can cancel the difference of the inclination angle from the preset angle Rx, if any. Then, the pressing direction of the workpieces W by the electrode rollers 15, 16 can be kept at the constant inclination angle Rx, and so favorable welding precision can be kept.

Although the diameters of the electrode rollers 15 and 16 may decrease, correction is made based on the difference ΔD of the distance measured by the two range sensors 42 and 43, and so correction can be made to the preset inclination angle Rx irrespective of the diameter of the electrode roller 15. The distance F can be made larger than the aforementioned embodiment, and so the correction precision of the inclination angle can be improved. Further, unlike the aforementioned embodiment, the step (STEP 1) is not necessary to control the posture of the seam-welding device 10 so that the straight line L0 for the upper electrode 15 is vertical.

Figure 6A:
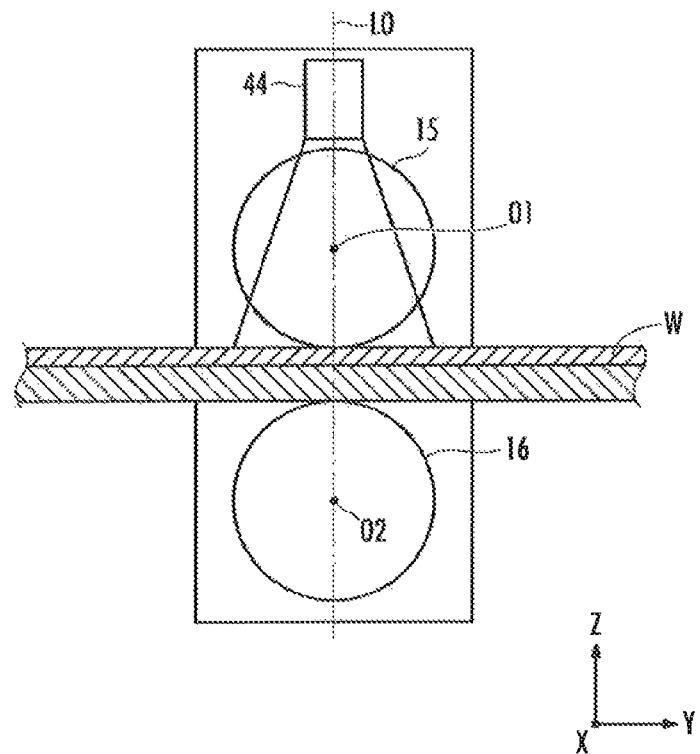
FIGS. 6A and 6B describe the relationship between electrode rollers and workpieces in still another embodiment of the present invention, where

The following describes still another embodiment of the present invention. As illustrated in FIG. 6A, this embodiment includes a two-dimensional range sensor 44 as measurement means at the base 11 or the movable base 14 to detect distance D to the surface of the workpieces W along the moving direction (Y direction) of the contact point between the electrode rollers 15, 16 and the workpieces W. Exemplary two-dimensional range sensor 44 includes a noncontact laser range finder.

Figure 6B:
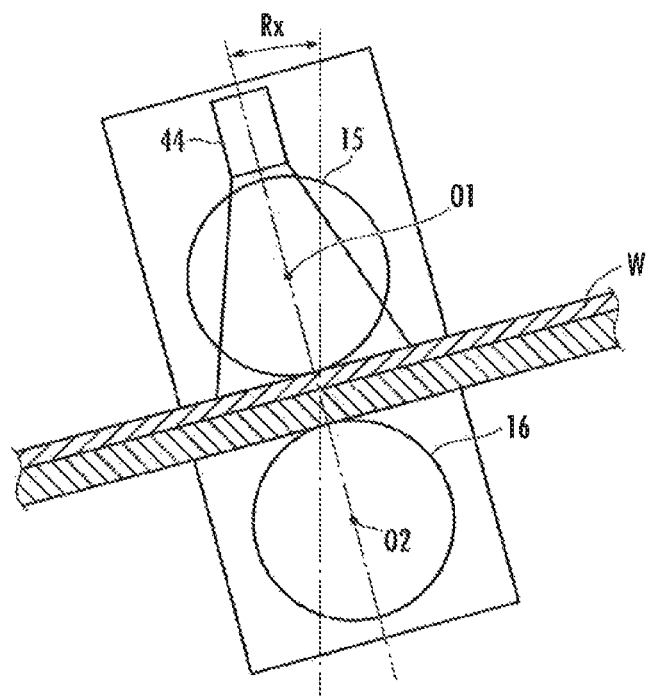

Then as illustrated in FIG. 6B, in the seam-welding device 10 having a predetermined posture where the workpieces W are sandwiched between the upper electrode 15 and the lower electrode 16, the straight line L0 is inclined from the vertical direction (Z direction) in the moving direction (+Y direction) of the contact point where the workpieces W are sandwiched between the upper electrode 15 and the lower electrode 16 by angle RX.

At this time, the two-dimensional range sensor 44 measures the distance D to the upper face of the workpieces W discretely along the Y direction. Then, the distance D(y) measured by the two-dimensional range sensor 44 can be represented as in the following expression (3) using the coordinates y by linear interpolation:

$$D(y)=A \times y + B \quad (3).$$

Then correction is made through the operation of the robot 20 so that difference ΔA between the coefficient A found here and the coefficient Am that is preset in accordance with the inclination angle Rx and the welding position of the workpieces W and is stored in the memory 31 is 0. Such correction is performed by the robot 20 so as to rotate the seam-welding device 10 around the X axis. When the seam-welding device 10 is moved by the robot 20 firstly to the predetermined posture, the rotating angle around the X axis may have a preset margin (allowance) with reference to the angle Rx.

When the upper face of the position to be welded of the workpieces W is flat, then the inclination angle Rx is represented by the following expression (4):

$$Rx = \tan^{-1}(A) \quad (4).$$

Then correction may be performed through the operation of the robot 20 so that the difference ΔRx between the inclination angle Rx found by expression (4) and preset inclination angle Rxm is 0.

In this way, the present embodiment is configured so that correction is made so that the straight line L0 is inclined by the inclination angle Rx based on the distance D(y) that is found by interpolation of a plurality of values of distance measured by the two-dimensional range sensor 44.

This can cancel the difference of the inclination angle from the preset angle Rx, if any. Then, the pressing direction of the workpieces W by the electrode rollers 15, 16 can be kept at the constant inclination angle Rx, and so favorable welding precision can be kept.

Although the diameters of the electrode rollers 15 and 16 may decrease, correction is made based on the coefficient A that is found from the distance D(y) measured by the two-dimensional range sensor 44, and so correction can be made to the preset inclination angle Rx irrespective of the diameter of the electrode roller 15. Further, the step (STEP 1) is not necessary to control the posture of the seam-welding device 10 so that the straight line L0 is vertical.

That is the description of the embodiments of the present invention, and the present invention is not limited to them. For instance, the above embodiments describe the case where the upper electrode 15 is movable vertically and the lower electrode 16 is fixed. This is not a limiting example, and the upper electrode 15 may be fixed and the lower electrode 16 may be movable vertically, or both of the upper electrode 15 and the lower electrode 16 may be movable vertically.

The above embodiments describe the case of measuring the distance to the upper face of the workpieces W by the measurement means 41 to 44. This is not a limiting example, and the distance to the lower face of the workpieces W may be measured by the measurement means.

DESCRIPTION OF REFERENCE NUMERALS

10 seam-welding device
11 base
12 guide rail
13 driving means, air cylinder
13a piston rod
14 movable base
15 upper electrode, electrode roller
16 lower electrode, electrode roller
17, 18 rotary-driving means
19 welding power-supply
20 robot
21 base
22 equalizing mechanism
30 controller (control means, measurement means, correction means)
31 memory
32 cylinder control unit
33 rotary driving control unit
34 power-supply control unit
35 distance calculation unit
36 robot control unit
41, 42, 43 range sensor (measurement means)
44 two-dimensional range sensor (measurement means)
100 seam-welding system
W workpiece

The invention claimed is:
1. A seam-welding method that performs seam-welding of a plurality of workpieces that are sandwiched between a pair of electrode rollers, while continuously moving a contact point between the electrode rollers and the workpieces and applying electricity across the electrode rollers, comprising the steps of:

measuring distance from a measurement sensor to a surface of the plurality of workpieces that are sandwiched between the pair of electrode rollers using the measurement sensor, wherein the measurement sensor has a predetermined positional relationship with the pair of electrode rollers; and making a correction based on the distance measured by the measurement sensor by moving the pair of electrode rollers with reference to the workpieces so that an angle between a straight line connecting centers of the pair of electrode rollers and the surface of the plurality of workpieces is a preset angle.

2. A seam-welding system that performs seam-welding of a plurality of workpieces that are sandwiched between a pair of electrode rollers, while continuously moving a contact point between the electrode rollers and the workpieces and applying electricity across the electrode rollers, comprising:

a measurement sensor that measures distance from the measurement sensor to a surface of the plurality of workpieces that are sandwiched between the pair of electrode rollers, the measurements sensor having a predetermined positional relationship with the pair of electrode rollers; and a correction device that moves the pair of electrode rollers with reference to the workpieces based on the distance found by the measurement sensor so that an angle between a straight line connecting centers of the pair of electrode rollers and the surface of the plurality of workpieces is preset angle.

3. The seam-welding method according to claim 1, wherein the measurement sensor is one of: a laser range sensor; a contact linear sensor; a magnet scale sensor; and a two-dimensional range sensor.

4. The seam-welding system according to claim 2, wherein the measurement sensor is one of: a laser range sensor; a contact linear sensor; and a magnet scale sensor; and the correction device comprises a robot and a controller, wherein the controller includes an electronic control unit and a memory on which is stored a control program, execution of the control program by the electronic control unit causing the controller to control the robot.

* * * * *